June 30, 1970
W. D. HORTON
3,517,744
HYDROCARBON PRODUCTION BY IN-SITU COMBUSTION
AND NATURAL WATER DRIVE
Filed Nov. 14, 1968
4 Sheets-Sheet 1
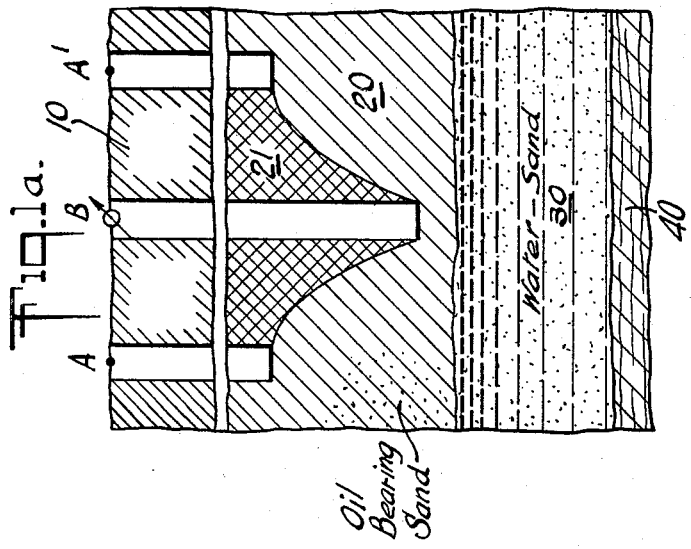
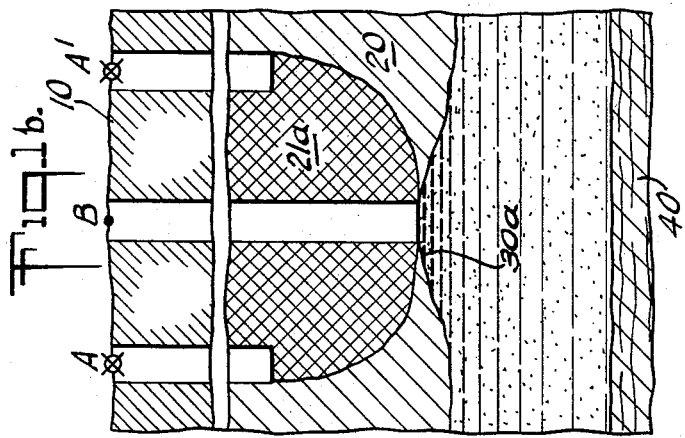
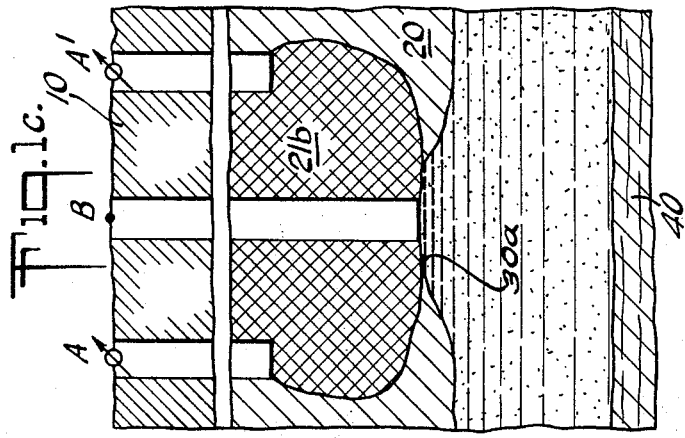
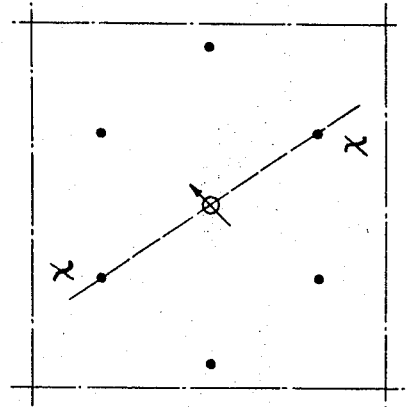
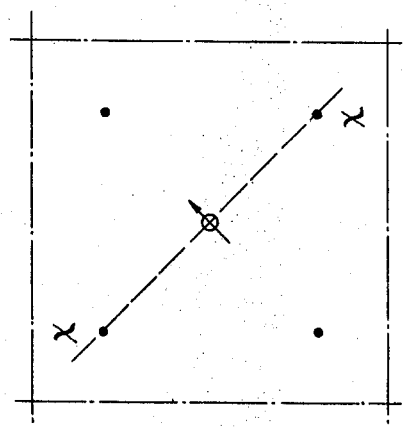

June 30, 1970 W. D. HORTON 3,517,744
HYDROCARBON PRODUCTION BY IN-SITU COMBUSTION
AND NATURAL WATER DRIVE
Filed Nov. 14, 1968 4 Sheets-Sheet 2

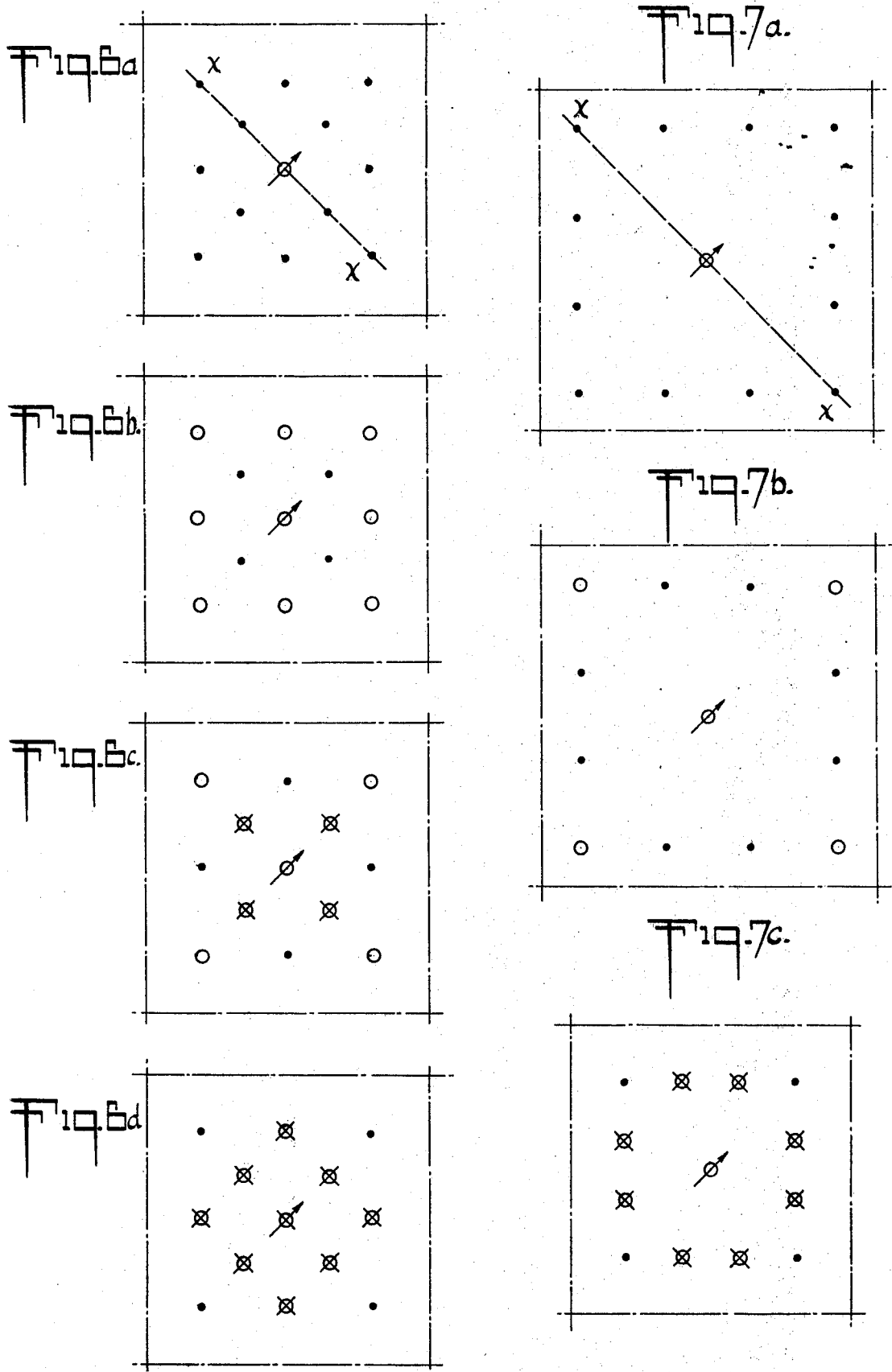

United States Patent Office 3,517,744
Patented June 30, 1970

---

3,517,744
HYDROCARBON PRODUCTION BY IN-SITU COMBUSTION AND NATURAL WATER DRIVE
William D. Horton, Midland, Tex., assignor to Texaco Inc., New York, N.Y., a corporation of Delaware
Filed Nov. 14, 1968, Ser. No. 775,841
Int. Cl. E21b 43/24
U.S. Cl. 166—245                                  21 Claims

---

ABSTRACT OF THE DISCLOSURE

Relates to a secondary recovery in situ combustion method involving three wells in line for exploiting a hydrocarbon-bearing formation under the influence of an aquifer providing an active water drive. The center well of the line, where in situ combustion is initiated, is completed for air injection low in the formation adjacent the aquifer, and offset wells are completed as production wells adjacent the top of the formation. When breakthrough of the combustion front occurs, all wells are put on a standby basis to permit the exploited part of the formation to be resaturated with formation fluids by the influence of the aquifer. Alternatively, the functions of the wells could be exchanged or only that of the center injection well, the wells suffering breakthrough being placed on a standby basis.

FIELD OF THE INVENTION

This invention relates generally to the production of hydrocarbons from underground hydrocarbon-bearing formations under the influence of active water-producing formations or aquifers, and more particularly, to a method for increasing the overall production of hydrocarbons therefrom.

DESCRIPTION OF THE INVENTION

In the production of hydrocarbons from permeable underground hydrocarbon-bearing formations, it is customary to drill one or more boreholes or wells into the hydrocarbon-bearing formations and produce hydrocarbons, such as oil, through designated production wells, either by the natural formation pressure or by pumping the wells. Sooner or later, the flow of hydrocarbons diminishes and/or ceases, even though substantial quantities of hydrocarbons are still present in the underground formations.

Thus, secondary recovery programs are now an essential part of the overall planning for virtually every oil and gas-condensate reservoir in underground hydrocarbon-bearing formations. In general, this involves injecting an extraneous fluid, such as water or gas into the reservoir zone to drive the oil or gas toward production wells by the process frequently referred to as "flooding."

Another secondary procedure employed for recovering the remaining hydrocarbons comprises the igniting and burning of hydrocarbons in situ within the permeable underground formations, whereby hot gases are generated to force hydrocarbons in the formation toward the production wells. While such in situ combustion has been quite successful in secondary recovery operations, it has been much less than one hundred percent efficient because the combustion front tends to progress through the formations along locally channeled paths from the injection area to the production area, thus bypassing substantial volumes of the hydrocarbons in the formation, rather than sweeping the hydrocarbons as a bank from a broad area of the formation.

SUMMARY OF THE INVENTION

It is an overall object of the present invention to provide an improved secondary recovery in situ combustion method involving initially three wells in line as part of a well pattern arrangement for exploiting a hydrocarbon-bearing formation under the influence of an active water-producing formation or aquifer to produce more of the hydrocarbons remaining in place in the formation, by changing the function of the wells in the pattern at strategic times to gain maximum control of the combustion front and active water drive.

A three well group is arranged in line so that the center well is completed for injection near the bottom of the formation adjacent the aquifer and the remaining two wells are offset and completed for production near the top of the formation. In situ combustion is initiated at the center well following injection of a combustion supporting fluid, such as air, thereinto and proceeds until breakthrough of the combustion front occurs at either or both of the offset production wells, at which time, air injection via the center well to maintain in situ combustion is terminated and the offset production wells are put on a stand-by basis, e.g., by being shut in completely. Alternatively, they may be used for air injection to continue the situ combustion with production being initiated at the center well until breakthrough of the aquifer. Because of the driving influence of the underlying active water-producing formation, it may be desirable to terminate both air injection and fluid production and permit that portion of the formation which has been exploited by in situ combustion to be resaturated with formation fluids by the active water drive, after which air injection and fluid production is resumed, and the several steps of exploitation repeated.

Other objects, advantages and features of the invention will become apparent from a consideration of the specification in the light of the figures of the drawings.

BRIEF DESCRIPTION OF THE DRAWINGS

FIG. 1a discloses a three well line unit penetrating into a hydrocarbon-bearing formation, wherein the center well is completed near the bottom of the formation adjacent an aquifer, and two offset wells are completed near the top of the hydrocarbon-bearing formation;

FIGS. 1b and 1c disclose the same three well line unit at alternate later steps of the method;

FIGS. 2 and 3 disclose, respectively, an inverted five-spot well pattern and an inverted seven-spot well pattern, to which the disclosures of the three well line unit of FIGS. 1a, 1b and 1c are applied;

FIGS. 6a, 6b, 6c and 6d disclose a thirteen well pattern, a combination of a standard inverted nine-spot well pattern and an inverted five-spot well pattern, to which the disclosures of the three well line unit of FIGS. 1a and 1b are applied;

FIGS. 7a, 7b and 7c disclose an inverted thirteen well quadrilateral side well pattern, to which the disclosures of the three well line unit of FIGS. 1a and 1b are applied.

Throughout the figures of the drawings, the same symbols will be maintained as follows: the open circle to indicate a well site, a solid circle to indicate a production well, a crossed circle to indicate a closed in well, and a single head arrowed circle to indicate an injection well.

DESCRIPTION OF THE PREFERRED EMBODIMENT

Figure 4A:
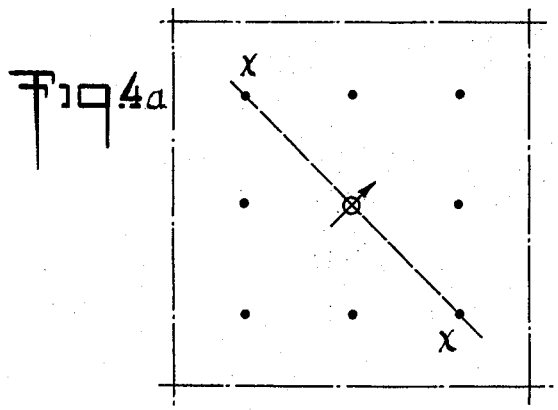
FIGS. 4a, 4b, 4c and 4d disclose an inverted nine-spot well pattern unit to which the disclosures of the three well line unit of FIGS. 1a, 1b and 1c are applied.

As disclosed herein, it is possible to explain more fully by in situ combustion the production from an underground hydrocarbon-bearing formation under the influence of an active water bearing formation or aquifer.

Referring now to the drawings, which schematically illustrate the practice and advantages of my invention, in FIG. 1a, there is disclosed a pair of offset wells A, A' extending from the surface of the earth, indicated at 10, penetrating into a hydrocarbon-bearing formation or oil-bearing sand, 20, and completed close to the top thereof. In addition, there is disclosed a center well B, penetrating into the hydrocarbon-bearing formation 20, and completed near the botom thereof adjacent an active water-producing formation or aquifer 30, above impermeable strata 40.

In this method, following the injection of a combustion supporting fluid, e.g. air, thereinto, an in situ combustion is initiated in the formation at well B and production is initiated at offset wells A, A' and continued until the in situ combustion front breaks through at wells A-A'. At this time, production is terminated along with air injection and all wells put on a standby basis, while the water drive from the aquifer 30 resaturates that part of hydrocarbon-bearing formation 20 which has been exploited by being subjected to the in situ combustion. This portion or burnt out area is indicated generally at 21.

Alternatively, as disclosed in FIG. 1b, production upon breakthrough at both wells A, A' may be terminated and the wells put on a standby basis, by being closed in, while production is initiated at well B until water coning occurs at 30a, because of the water drive from the aquifer. Meanwhile, some in situ combustion continues, the portion of the formation indicated as 21, FIG. 1a, being enlarged to the extent as indicated at 21a in FIG. 1b.

Another alternative upon breakthrough of the situ combustion front at well bores A, A', as indicated in FIG. 1a, would be to terminate production thereat and convert these wells to air injection wells to continue the in situ combustion, air injection via well B being terminated and production initiated and continued until water coning occurs as indicated at 30a FIG. 1c, because of the active water drive. In the interim, an additional portion of the hydrocarbon-bearing formation has been subjected to continuing in situ combustion, being enlarged to the extent as indicated at 21b, FIG. 1c.

Referring now to FIGS. 2 and 3, there are disclosed, respectively, an inverted five-spot well pattern and an inverted seven-spot well pattern, with the dashed line indicating the three well unit disclosed in section in FIG. 1a, and labeled X—X. Only one line is shown in each figure, but obviously lines through each of the vertices will satisfy the condition of the three wells in line.

FIG. 4a discloses an inverted nine-spot well pattern wherein the three well line unit disclosed in section in FIG. 1a is indicated by the dashed line X—X. Similarly lines through the other vertices and through the side wells will satisfy the condition of three wells in line.

Figure 4B:
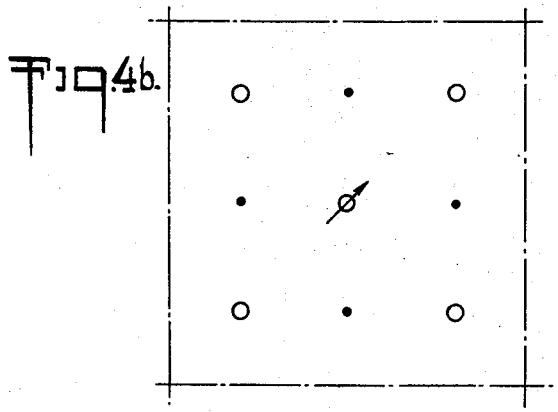
Figure 4C:
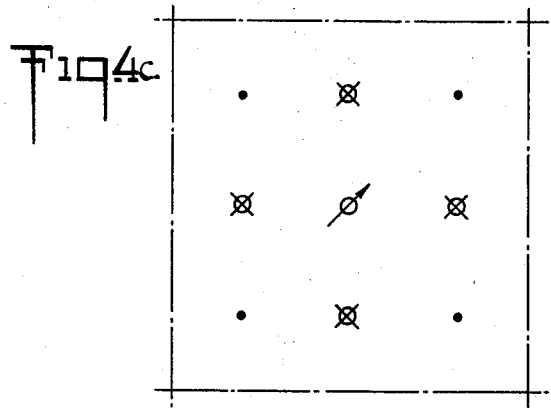
Figure 4D:
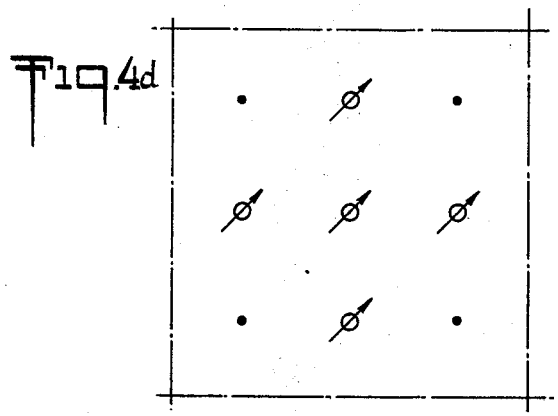

FIGS. 4b, 4c and 4d show additional aspects of the in situ combustion method as illustrated in FIGS. 1a, 1b and 1c. In FIG. 4b, production is disclosed as proceeding from the side wells of the inverted nine-spot well pattern, with injection at the central well, as disclosed generally in FIG. 1a, while the corner wells of the nine-spot well pattern are indicated as being well sites, on a standby basis. Upon breakthrough of the in situ combustion front at the side production wells, these latter wells are put on a standby basis, by being closed in as shown in FIG. 4c; or alternatively, they may be converted to injection wells, as shown in FIG. 4d. In either instance, injection through the central well is maintained and then the corner wells are put on production until breakthrough occurs thereat. Thereupon, these wells are put on a standby basis along with the central injection well, thus permitting the area previously subjected to in situ combustion to be resaturated with formation fluids by the active water drive, after which the steps as indicated either in FIG. 4a or in FIGS. 4b and 4c or 4d, are repeated in turn.

Figure 5A:
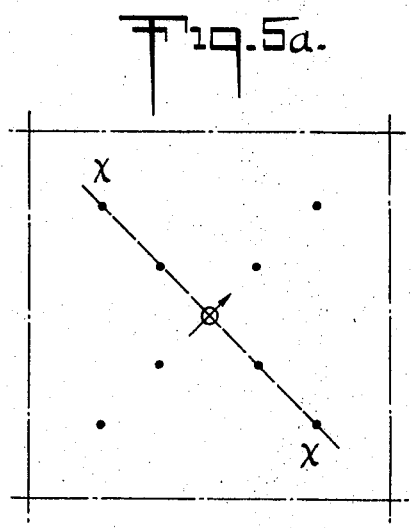
FIGS. 5a, 5b and 5c disclose a nine well diagonal pattern to which the disclosures of the three well line unit of FIGS. 1a and 1b are applied.
Figure 5B:
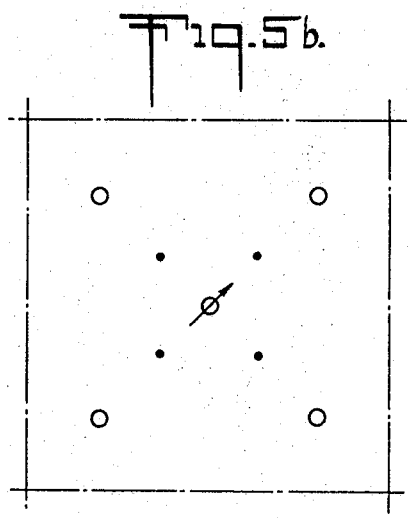
Figure 5C:
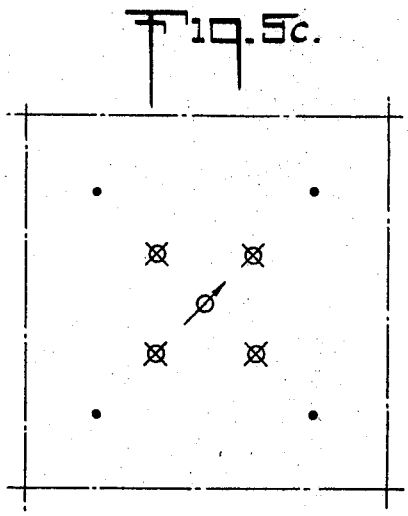

FIGS. 5a, 5b and 5c disclose an inverted nine-well diagonal pattern wherein the production wells are positioned uniformly along the diagonals of the quadrilateral and the injection well is the central well. The three well line unit disclosed in section in FIG. 1a is located on the dashed line X—X. Upon breakthrough at any of the production wells of the in situ combustion front, production thereat ceases and the well or wells are put on a standby basis, by being closed in. Alternatively, such a well could be used for injection while the combustion front spreads to the remaining production wells, which have not yet suffered breakthrough. Upon such an occurrence, these wells also are put on a standby basis prior to termination of production from the entire pattern, permitting resaturation with formation fluids by the active water drive.

FIGS. 6a, 6b, 6c and 6d disclose the manner of applying the disclosure of FIGS. 1a and 1b to a 13 well quadrilateral pattern formed from the combination of inverted nine-spot well pattern and an inverted five-spot well pattern.

In FIG. 6a, injection is through the central well with all the remaining pattern wells being on production. The dashed line X—X indicates the location of the three well line unit disclosed in section in FIG. 1a. Alternatively, production could be maintained at the four interior wells, with injection still at the central well, while the remaining pattern wells along the sides and at the corners defining the quadrilateral are maintained on a standby basis, as disclosed in FIG. 6b. In FIG. 6c, production is indicated as occurring at the side wells of the quadrilateral with the corner wells on a standby basis, and the interior quadrilateral wells closed in or converted to injection wells.

In FIG. 6d, the last step of this process is disclosed wherein production is initiated at the corner wells, after the combustion front breakthrough at the former production wells, either being shut in or converted to injection wells for continuation of the in situ combustion. After all the wells have been put on a standby basis, the exploited portion of the formation is permitted to be resaturated with formation fluids by the active water drive.

FIGS. 7a, 7b and 7c disclose the manner of the application of a three well line unit disclosed in FIGS. 1a and 1b to an inverted thirteen well quadrilateral side well pattern, all the side wells defining the quadrilateral in FIG. 7a being on production while the central well is used as an injection well. The dashed line X—X indicates the location of the three well line unit shown in section in FIG. 1a.

In FIG. 7b, as in FIG. 4b, injection is through the central well, production is initiated and maintained along the side wells until breakthrough occurs thereat, the wells at the corners being on a standby basis. FIG. 7c discloses the continuation of the process with air injection through the central well, the former production wells along the sides being either closed in or converted to air injection wells, and the corner wells being on production until breakthrough occurs thereat, whereupon they are put on a standby basis along with remaining wells of the pattern, permitting resaturation of the formation due to the influence of the aquifer.

Figure 8A:
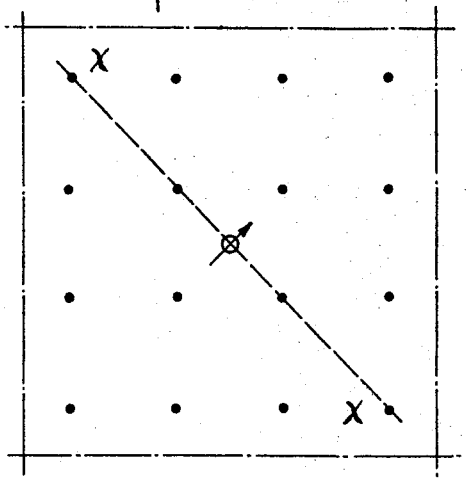
FIGS. 8a, 8b, 8c and 8d disclose an inverted seventeen-well quadrilateral pattern, to which the disclosures of the three well line unit of FIGS. 1a and 1b are applied.

FIGS. 8a, 8b, 8c and 8d disclose the application of three well line unit of FIG. 1a to an inverted seventeen-well quadrilateral pattern with the production wells located uniformly along the sides and diagonals of the quadrilateral, air injection being through the central well. In FIG. 8a, all the pattern wells except the central injection well are put on production until breakthrough occurs at the individual wells, at which time the individual wells suffering combustion front breakthrough are put on a standby basis or converted to air injection wells and production continued until the entire field of wells has been put on a standby basis, and then the formation is permitted to be resaturated with formation fluids by the active water drive. The three well line unit disclosed in section in FIG. 1a is located along the dashed line X—X.

Figure 8B:
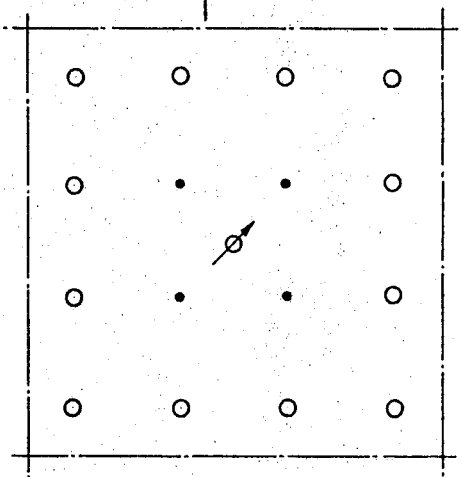
Figure 8C:
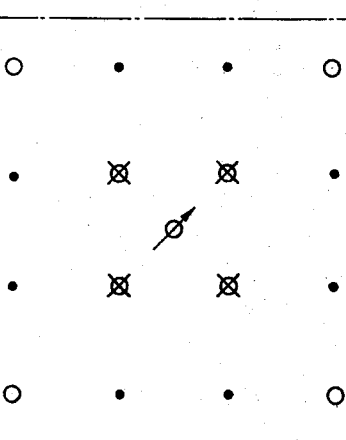

In FIG. 8b, only the four interior diagonal wells are put on production, with air injection through the central well and the outside wells of the quadrilateral pattern being on a standby basis. In FIG. 8c, the four interior wells, upon combustion front breakthrough thereat, are put on a standby basis by being closed in or converted to air injection, while the side wells of the pattern are put on production, the corner wells being kept on a standby basis.

Figure 8D:
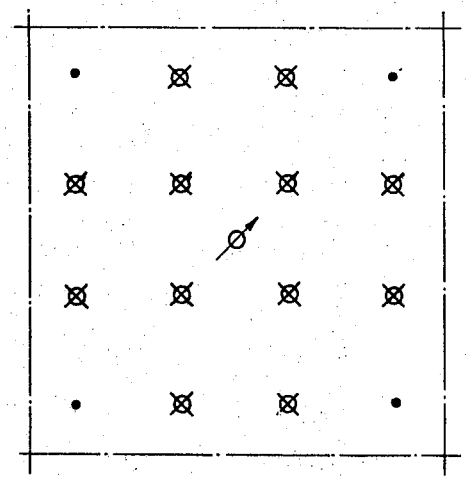

FIG. 8d discloses the final step of the process of exploiting the seventeen-well quadrilateral pattern with the four corner wells being put on production after combustion front breakthrough has occurred at the side production wells, which latter are put on a standby basis by being closed in or alternatively being converted to air injection wells until breakthrough occurs at the corner wells, at which time all wells are put on a standby basis and the formation is permitted to be resaturated with formation fluids by the active water drive. For purposes of clarity and expediency of disclosure, the alternate showings of the conversions of production wells where breakthrough has occurred to injection wells have been omitted in the cases of FIG. 5c, FIGS. 6c and 6d, FIG. 7c, FIGS. 8c and 8d, inasmuch as the alternate disclosures in FIGS. 4c and 4d are deemed sufficient to one skilled in the art to understand the various steps of the method without further illustrations thereof. Wherever the term "standby basis" occurs throughout the application, it should be interpreted to cover a well site, a closed in well or alternatively an injection well, in addition to the central injection well.

Thus, there has been shown and described how a three well line unit of an in situ combustion operation is applied to various well patterns to exploit a production field subject to an active water drive to more fully complete the exploitation thereof.

Other modifications and variations of the invention as hereinbefore set forth may be made without departing from the spirit and scope thereof and therefore only such limitations should be imposed as are indicated in the appended claims.

I claim:
1. A method of producing formation fluids including hydrocarbons from an underground hydrocarbon-bearing formation under the influence of an aquifer providing an active water drive involving three wells penetrating into said formation with an injection well completed in the lower portion of said formation adjacent said aquifer and a pair of offset production wells completed in the upper part of said formation comprising the steps of injecting a combustion supporting fluid into said formation via said injection well, initiating in situ combustion thereat while producing fluids including hydrocarbons from said formation via said production wells, maintaining said in situ combustion by continuing the injection of said combustion supporting fluid via said injection well until breakthrough of the combustion front of said in situ combustion occurs at a production well, thereupon placing said production well on a standby basis and ceasing injecting said combustion supporting fluid thereby permitting the exploited portion of said formation to be resaturated with formation fluids by the active water drive, and thereafter repeatedly initiating and maintaining in situ combustion at said injection well while producing from said offset production wells until breakthrough of said combustion front thereat, placing the production well where breakthrough occurs on a standby basis and ceasing injecting at said injection well, thereby permitting resaturation with formation fluids of the exploited portion of said formation.

2. In a method of producing fluids as defined in claim 1, the step of terminating injecting combustion supporting fluid via said injection well and placing said production well where breakthrough occurs on a standby basis, and thereafter producing from said formation via said injection well prior to placing said wells penetrating into said formation on a standby basis for resaturation thereof with formation fluids.

3. In a method of producing fluids as defined in claim 1, the step of terminating injecting combustion supporting fluid via said injection well upon breakthrough of the combustion front at a production well and thereafter initiating producing fluids from said formation via said injection well, meanwhile terminating producing fluids via said production well where breakthrough has occurred and initiating injecting combustion supporting fluid thereinto prior to placing said wells penetrating into said formation on a standby basis for resaturation thereof with formation fluids.

4. In a method of producing fluids as defined in claim 1, said three wells being in line.

5. In a method of producing fluids as defined in claim 4, said three wells being part of an inverted five-spot pattern.

6. In a method of producing fluids as defined in claim 4, said three wells being part of an inverted seven-spot pattern.

7. In a method of producing fluids as defined in claim 4, said three wells being part of an inverted nine-spot pattern.

8. In a method of producing fluids as defined in claim 7, meanwhile injecting combustion supporting fluid into the central well of said pattern and producing formation fluids via the remaining pattern wells simultaneously until breakthrough occurs at a production well, whereupon such production well is put on a standby basis, and continuing the aforementioned injection and producing until all production wells of the pattern are placed on a standby basis, thereupon terminating injecting via said central well and permitting the exploited portion of said formation to be resaturated with formation fluids by the active water drive of said aquifer.

9. In a method of producing fluids as defined in claim 7, meanwhile injecting combustion supporting fluid via the central well of said pattern and producing formation fluids from the side wells of said pattern, continuing injecting and producing until breakthrough of said combustion front occurs at said side wells, placing said side wells where such breakthrough occurs on a standby basis, thereafter initiating producing formation fluids at the corner wells of said pattern and maintaining producing until breakthrough of said combustion front occurs thereat, and then placing all pattern wells on a standby basis until the exploited portion of said formation is resaturated with formation fluids by said active water drive.

10. In a method of producing fluids as defined in claim 4, said three wells in line being part of a nine well diagonal pattern.

11. In a method of producing fluids as defined in claim 10, meanwhile injecting combustion supporting fluid into the central well of said pattern and producing formation fluids via the remaining pattern wells simultaneously until breakthrough occurs, thereupon placing each well in turn at which said breakthrough occurs on a standby basis, continuing producing formation fluids until breakthrough occurs at all production wells, thereafter placing all wells of said pattern on a standby basis, and permitting the exploited portion of said formation to be resaturated with formation fluids by said active water drive.

12. In a method of producing fluids as defined in claim 10, meanwhile injecting combustion supporting fluid into the central well of said pattern and initiating producing formation fluids via the wells immediately adjacent said central well and continuing producing until therethrough of the combustion front occurs thereat, placing each well at which said breakthrough occurs on a standby basis and then initiating and continuing producing via the corner pattern wells until breakthrough occurs thereat, thereupon placing all wells of said pattern on standby basis permitting the exploited portion of said formation to be resaturated with formation fluids by said active water drive.

13. In a method of producing fluids as defined in claim 4, said three wells in line being part of a thirteen well pattern wherein the central well of said pattern is an injection well and the remaining pattern wells being production wells arranged uniformally along the sides and on the diagonals of a quadrilateral.

14. In a method of producing fluids as defined in claim 13, initiating producing formation fluids via all of said production wells simultaneously while injecting combustion supporting fluid into said formation via said central well.

15. In a method of producing fluids as defined in claim 13, injecting combustion supporting fluid into said formation via said central well and producing formation fluids via said wells located on the diagonals of said pattern immediately adjacent said injection well and continuing producing therefrom until breakthrough of said combustion front occurs, thereupon placing said aforementioned wells on a standby basis and initiating producing from the side wells of said pattern and continuing until combustion front breakthrough occurs thereat, thereupon placing on a standby basis and initiating and continuing producing formation fluids via the corner wells of said pattern until combustion front breakthrough occurs thereat, thereupon placing said wells on a standby basis, permitting the exploited portion of said formation to become resaturated with formation fluids by said active water drive.

16. In a method of producing fluids as defined in claim 4, said three wells in line being part of a thirteen well quadrilateral pattern having a central injection well and the remaining pattern wells being arranged uniformly along the sides of said pattern as production wells.

17. In a method of producing fluids as defined in claim 16, continuing injecting a combustion supporting fluid into said formation via said central well and producing from the remainder pattern wells until combustion front breakthrough occurs at a production well, placing each such production well on a standby basis and continuing producing from the remaining production wells until breakthrough occurs thereat, thereafter placing on standby status each production well in turn where breakthrough occurs, and maintaining such step until all the production wells are placed on a standby basis, thereupon ceasing injecting via the central well to permit the exploited portion of said formation to be resaturated with formation fluids by said active water drive.

18. In a method of producing fluids as defined in claim 16, injecting a combustion supporting fluid into said formation via said central well and producing formation fluids via the side wells of said pattern until combustion front breakthrough thereat, thereupon placing said side wells on a standby basis and initiating and continuing producing formation fluids via the corner production wells and until combustion front breakthrough occurs thereat, thereupon placing all wells of said pattern on a standby basis, permitting the exploited portion of said formation to be resaturated with formation fluids by said active water drive.

19. In a method of producing fluids as defined in claim 4, said three wells in line being part of a seventeen well pattern, the central well being an injection well and the remaining wells being production wells located uniformly along the sides and on the diagonals of a quadrilateral.

20. In a method of producing fluids as defined in claim 19, continuing injecting a combustion supporting fluid via said central well and producing simultaneously from all of the remaining wells of the pattern until breakthrough occurs at individual production wells, thereupon placing said individual production wells on a standby basis and continuing producing via the remaining production wells until breakthrough occurs thereat and placing each of said remaining production wells on a standby status, and thereafter with all wells of said pattern on standby status permitting the exploited portion of said formation to be resaturated with formation fluids by said active water drive.

21. In a method of producing fluids as defined in claim 19, continuing injecting a combustion supporting fluid into said formation via said central well and producing formation fluids via said wells spaced on the diagonals of said pattern immediately adjacent the central injection well and continuing producing therefrom until combustion front breakthrough occurs at such production wells, thereupon placing such wells on a standby status and initiating and continuing producing at the side wells of said pattern until breakthrough occurs thereat, thereupon placing said side wells on a standby basis, and initiating and continuing producing at the corner production wells until breakthrough occurs thereat, thereupon with all wells placed on a standby basis, permitting the exploited portion of said formation to be resaturated with formation fluids by said active water drive.

References Cited

UNITED STATES PATENTS

| | | | |
|---|---|---|---|
| 3,152,640 | 10/1964 | Marx | 166—245 |
| 3,167,121 | 1/1965 | Sharp | 166—259 |
| 3,193,008 | 7/1965 | Moore | 166—258 |
| 3,215,198 | 11/1965 | Willman | 166—263 |
| 3,332,480 | 7/1967 | Parrish | 166—245 |
| 3,349,846 | 10/1967 | Trantham et al. | 166—258 X |
| 3,393,735 | 7/1968 | Altamira et al. | 166—263 X |
| 3,402,768 | 9/1968 | Felsenthal et al. | 166—263 X |

STEPHEN J. NOVOSAD, Primary Examiner

U.S. Cl. X.R.

166—258, 263